J. F. PARKER.
CASH REGISTER, INDICATOR, AND RECORDER.
APPLICATION FILED APR. 16, 1908.
913,549.
Patented Feb. 23, 1909.
11 SHEETS—SHEET 2.
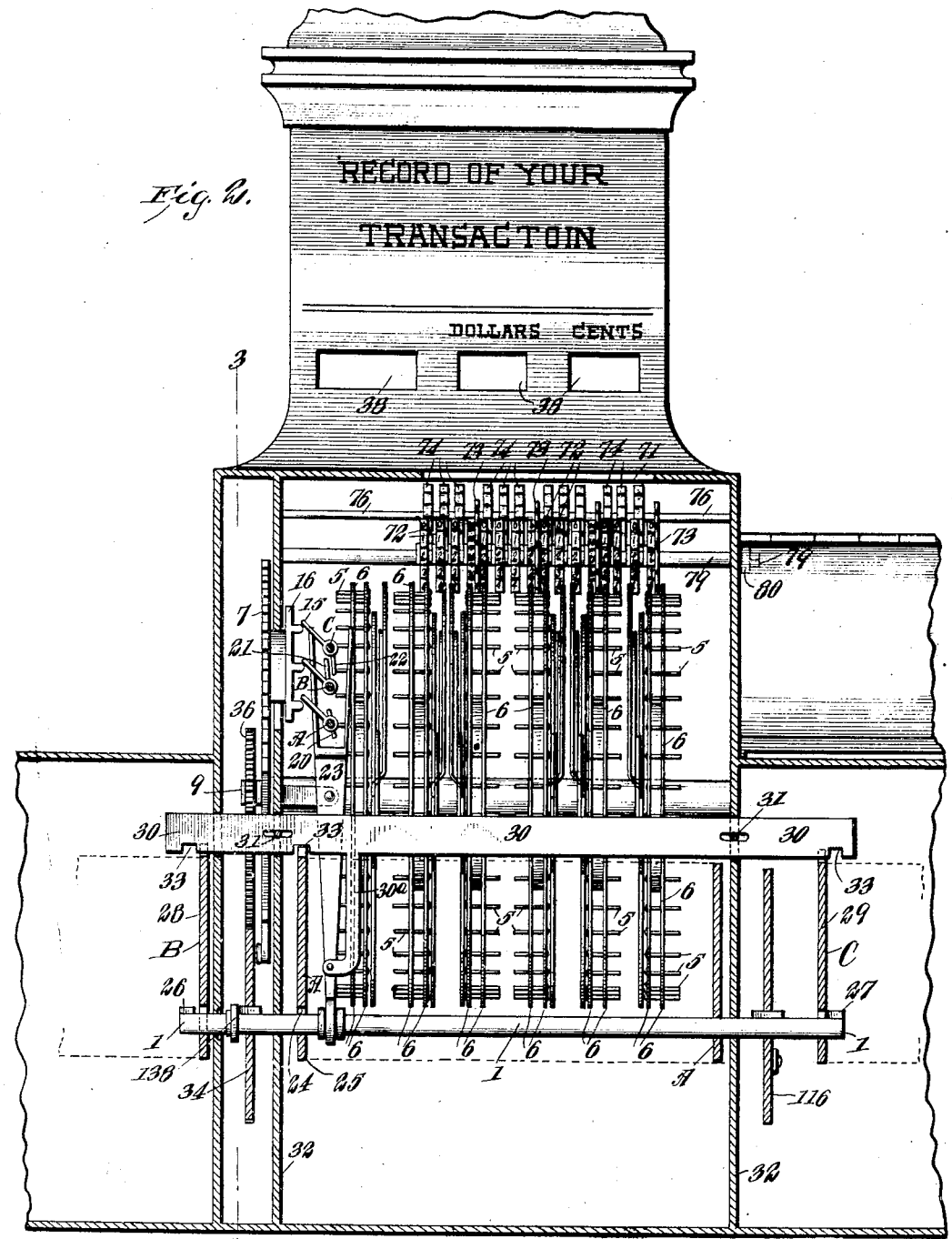
WITNESSES
INVENTOR
JOHN F. PARKER
BY
ATTORNEYS J. F. PARKER.
CASH REGISTER, INDICATOR, AND RECORDER.
APPLICATION FILED APR. 16, 1908.
913,549.
Patented Feb. 23, 1909.
11 SHEETS—SHEET 3.
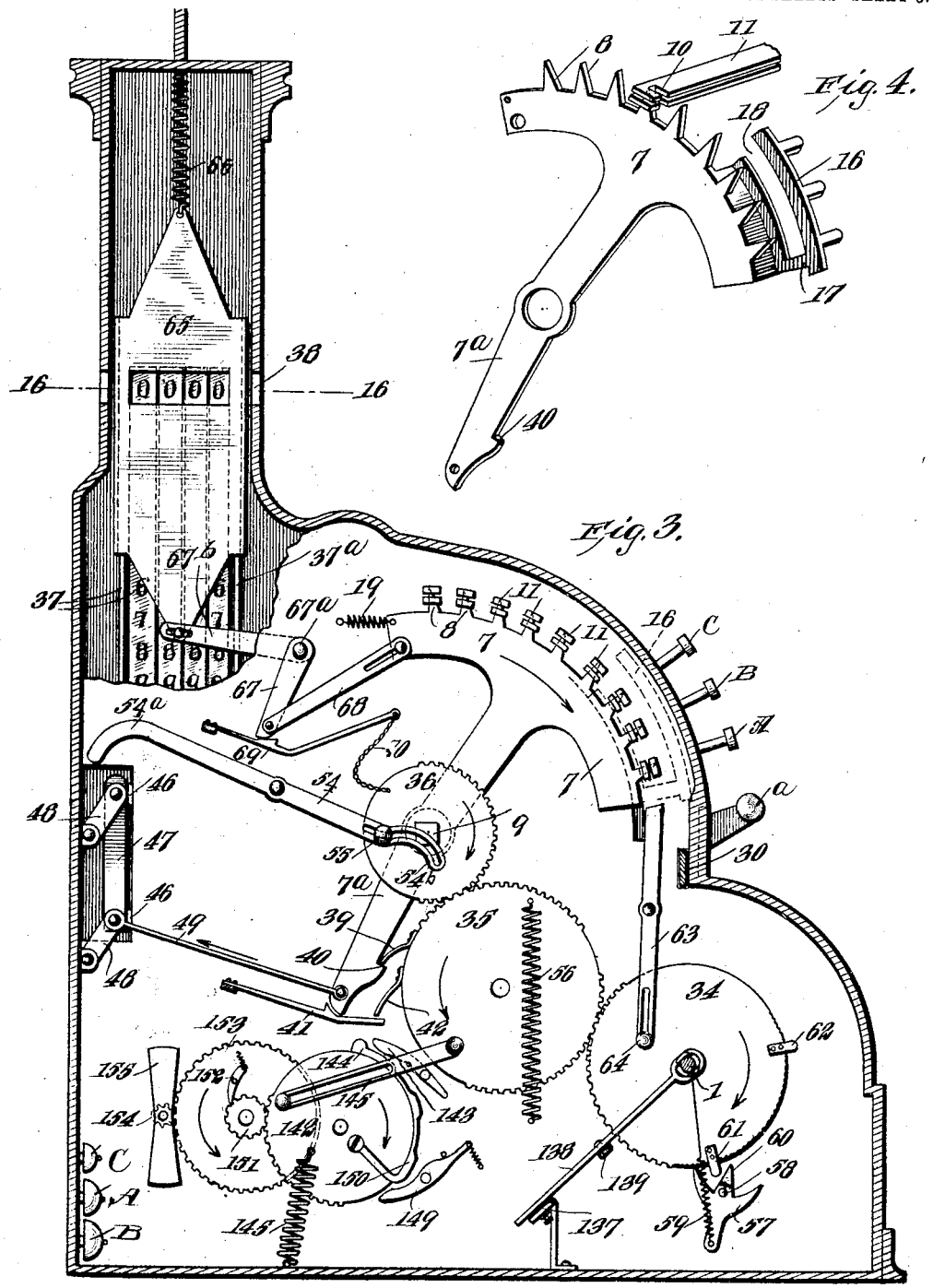
Witnesses
E. M. Callaghan
Amos W. Hart
By Attorney
Munn & Co.
Inventor
John F. Parker

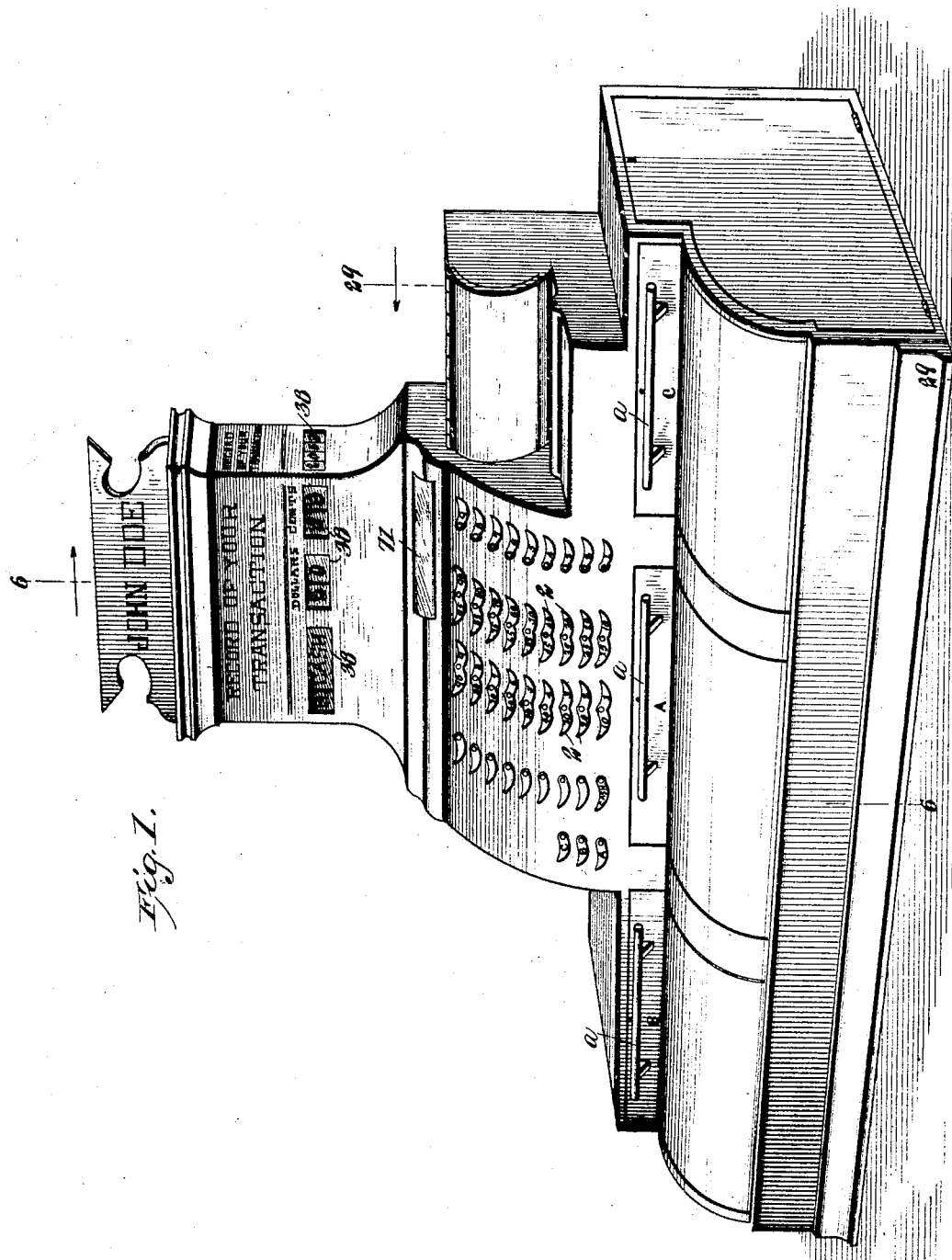

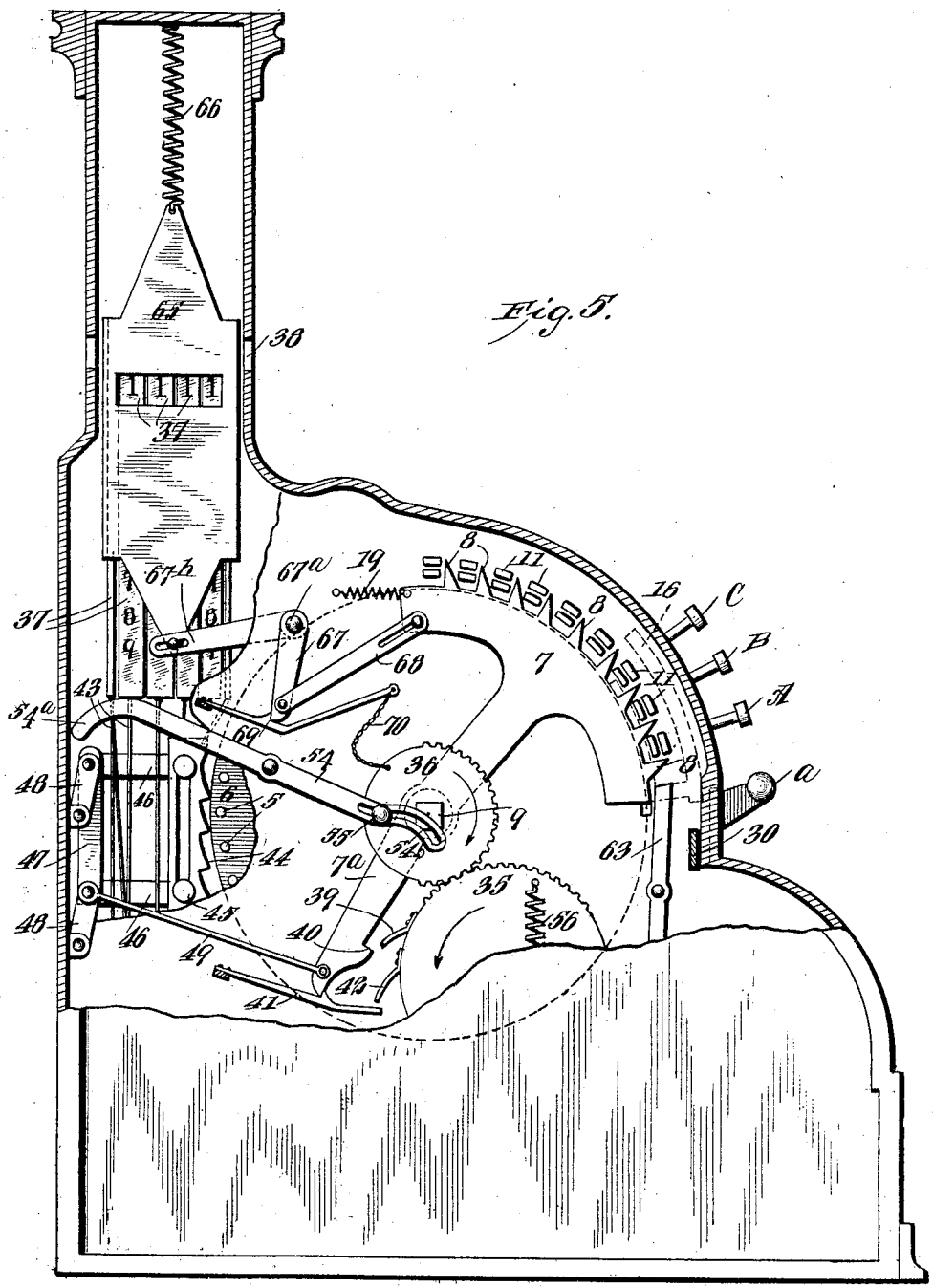

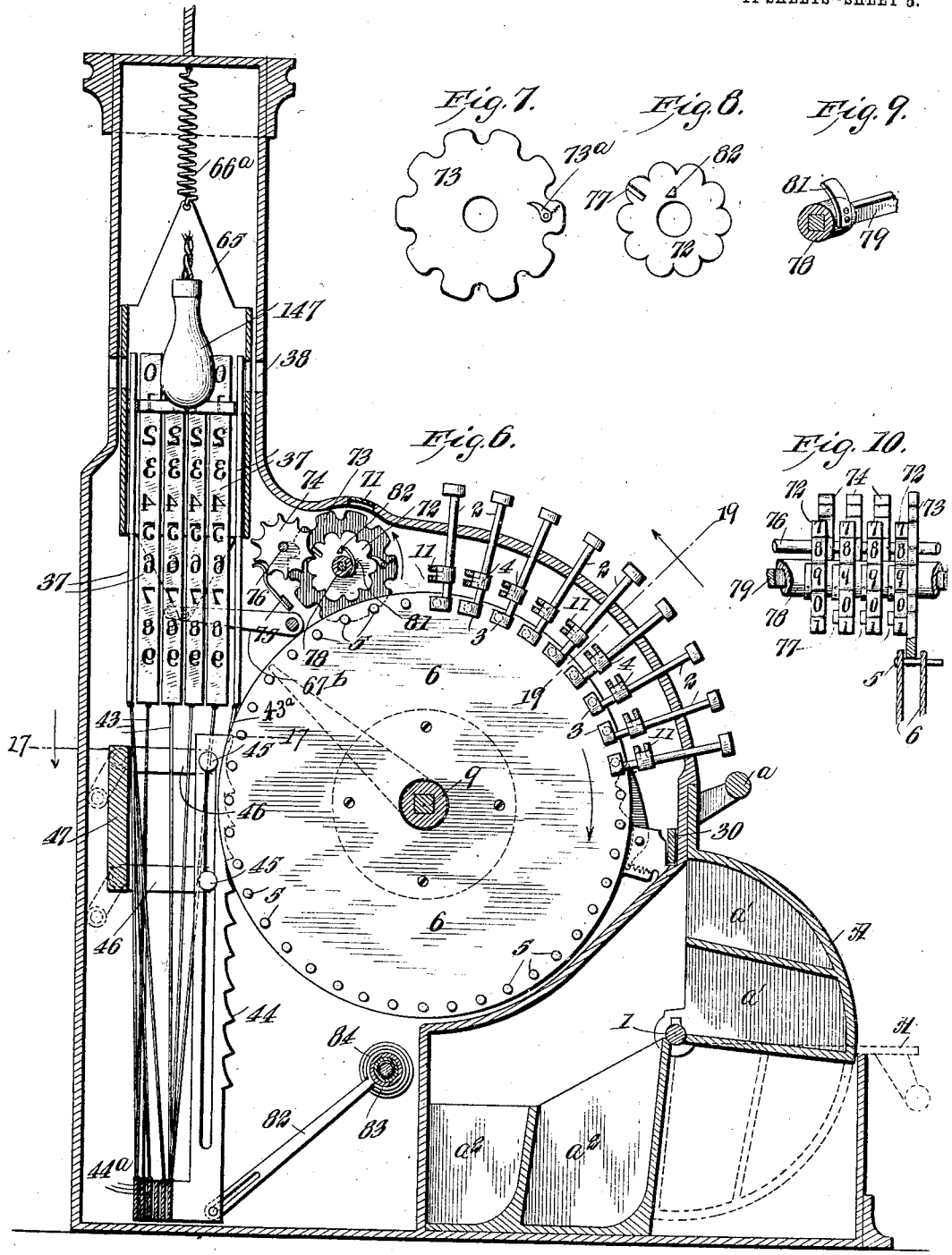

J. F. PARKER.
CASH REGISTER, INDICATOR, AND RECORDER.
APPLICATION FILED APR. 16, 1908.
913,549.
Patented Feb. 23, 1909.
11 SHEETS—SHEET 6.
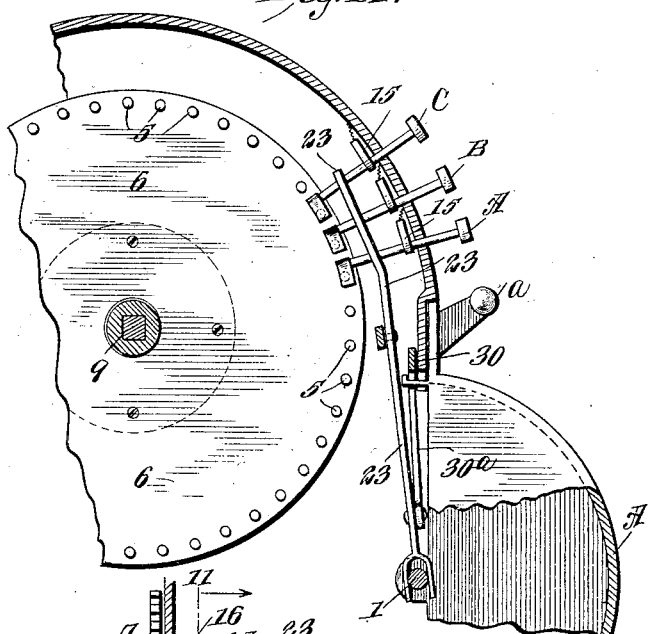
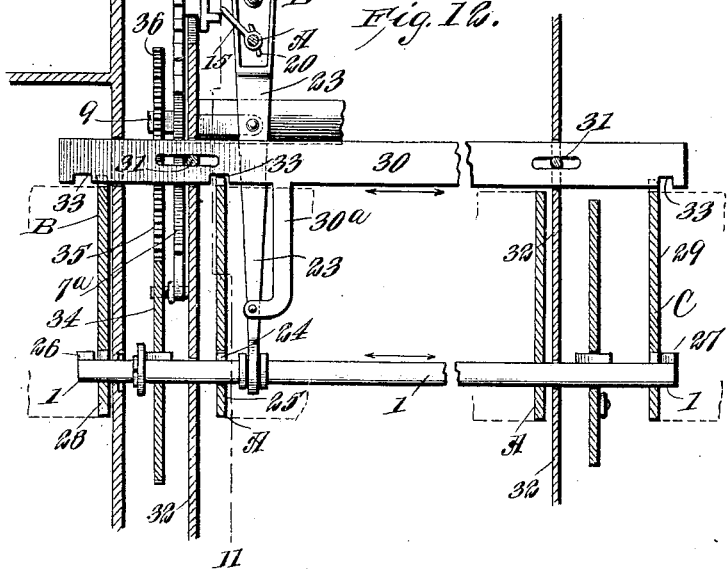
WITNESSES
INVENTOR
JOHN F. PARKER
BY
ATTORNEYS

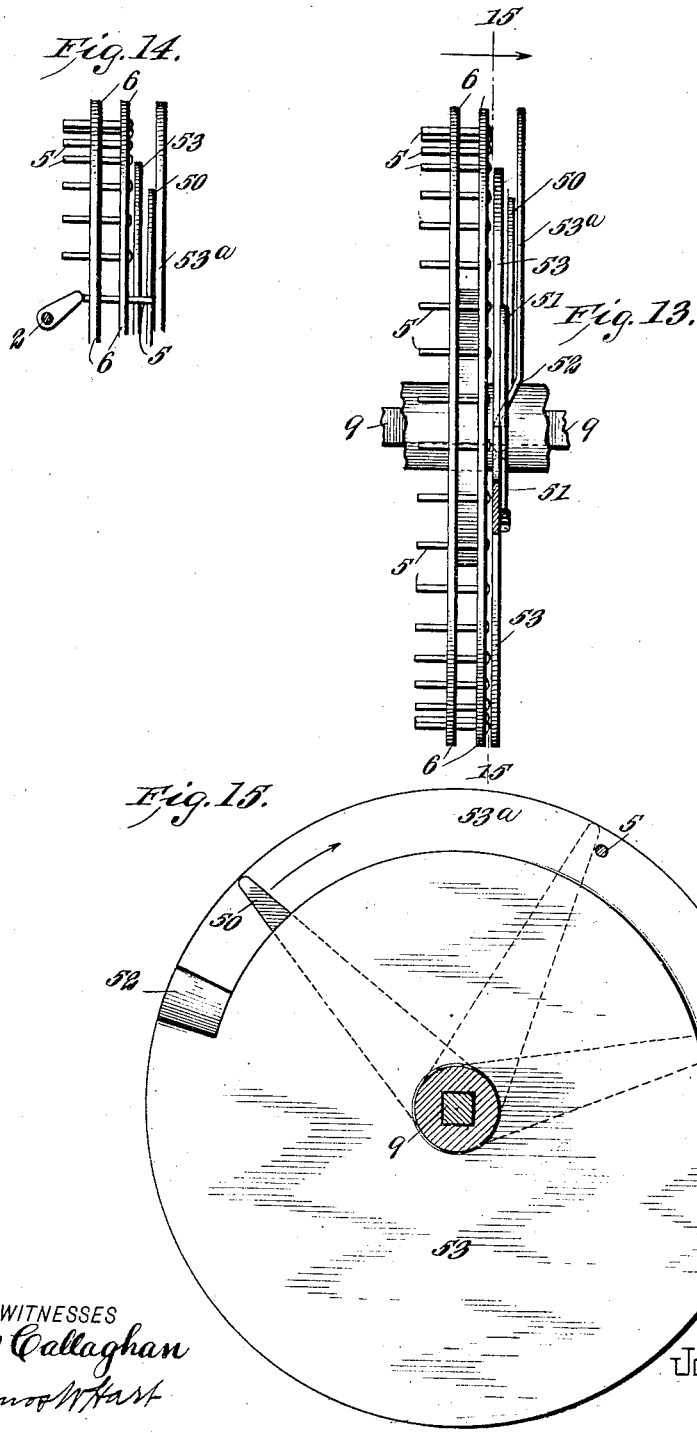

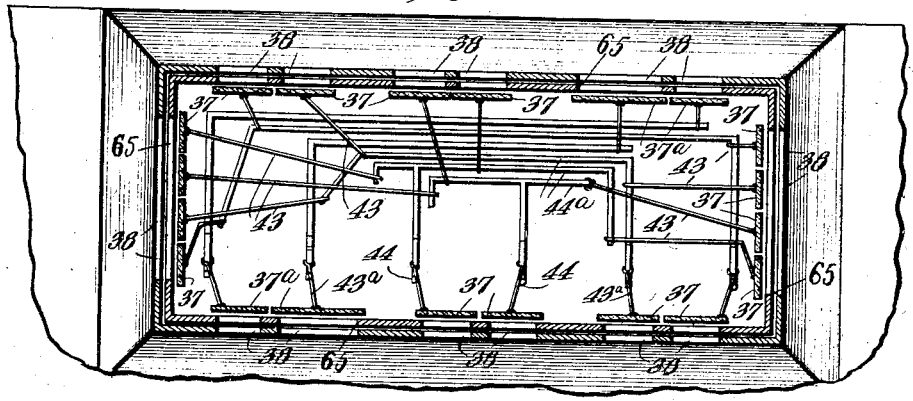

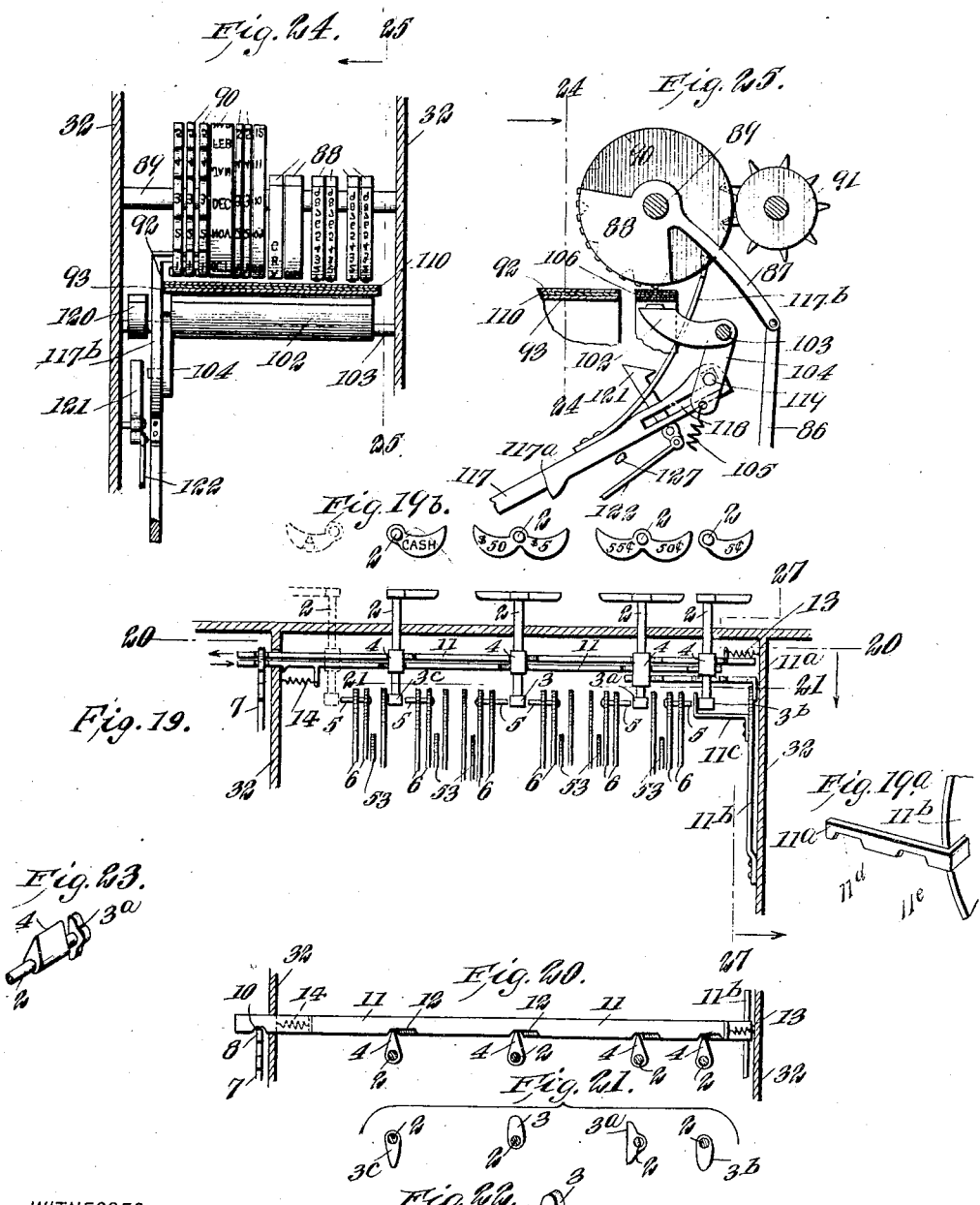

J. F. PARKER.
CASH REGISTER, INDICATOR, AND RECORDER.
APPLICATION FILED APR. 16, 1908.
913,549.
Patented Feb. 23, 1909.
11 SHEETS—SHEET 10.
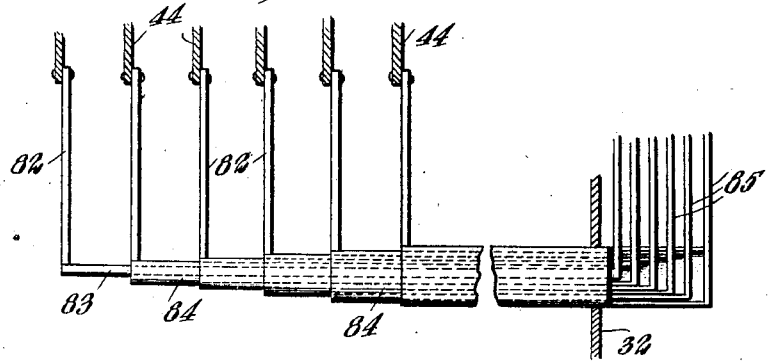
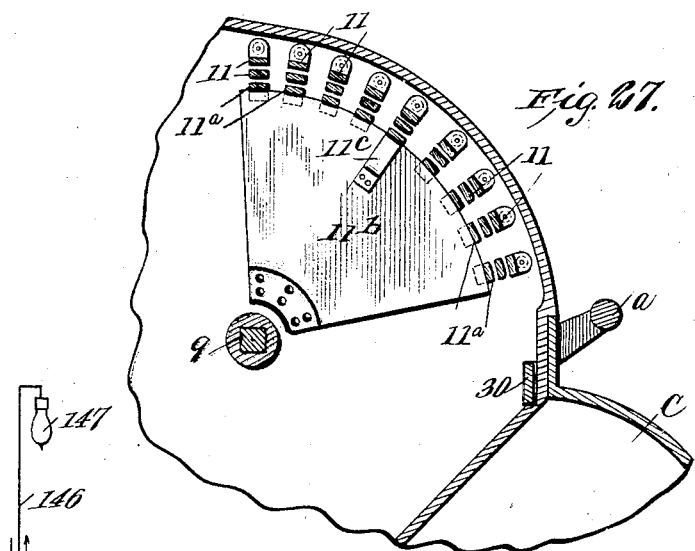
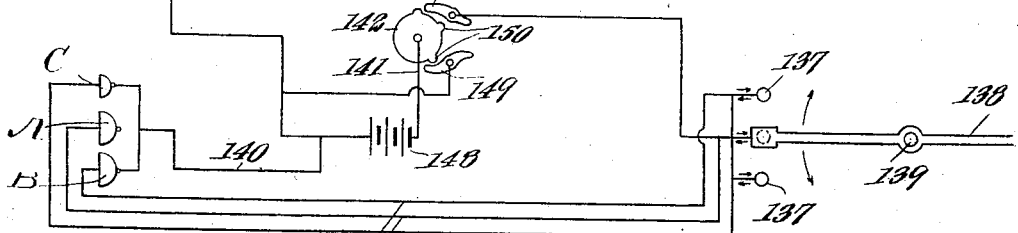
WITNESSES
E. M. Callaghan
Amos H. Hart
INVENTOR
John F. Parker
BY Munn & Co.
ATTORNEYS.

J. F. PARKER.
CASH REGISTER, INDICATOR, AND RECORDER.
APPLICATION FILED APR. 16, 1908.
913,549.
Patented Feb. 23, 1909.
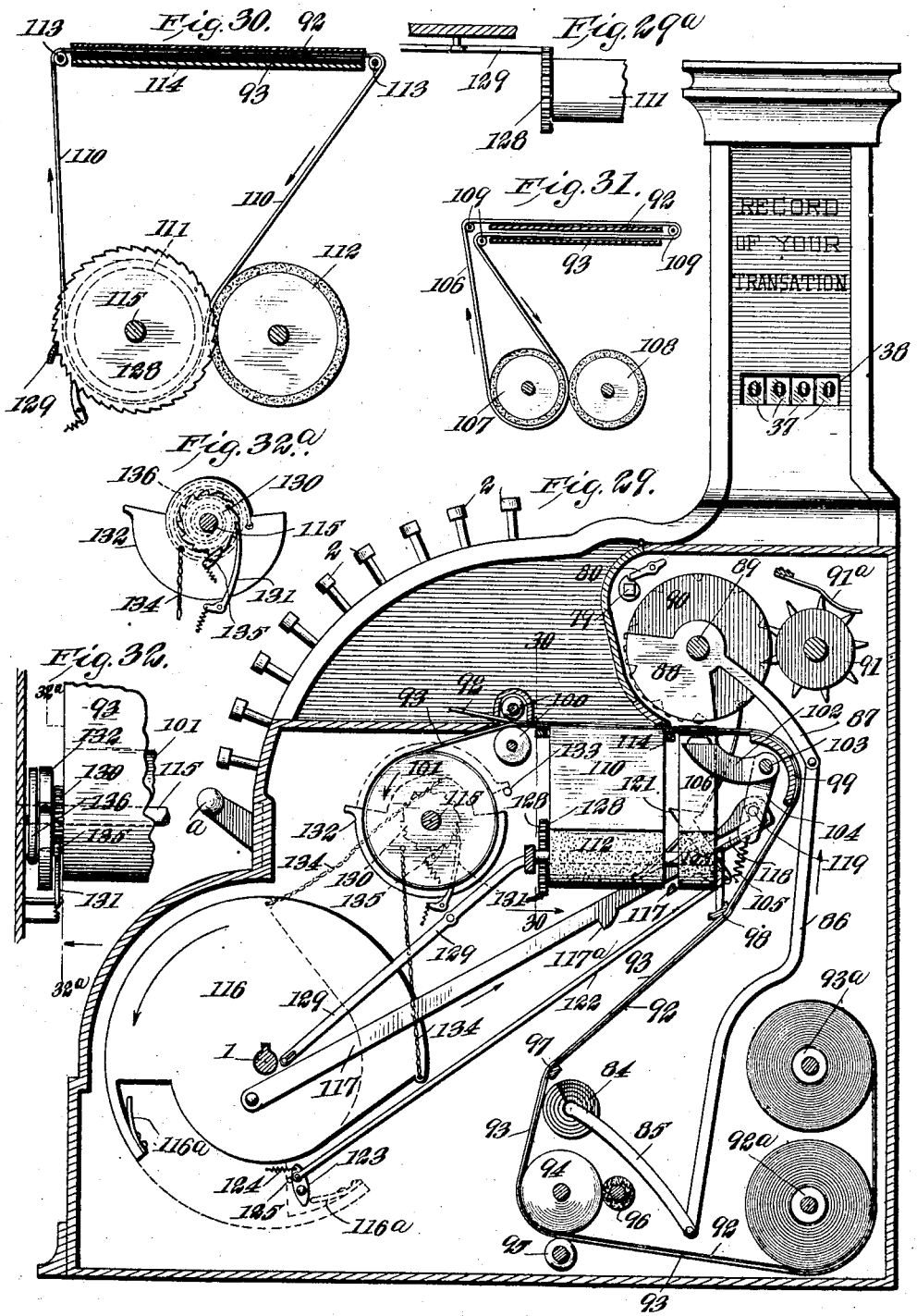
Witnesses
E. M. Callaghan
Amos W. Hart
Inventor
JOHN F. PARKER
By Attorney
Munn & Co.

UNITED STATES PATENT OFFICE.

JOHN F. PARKER, OF KANSAS CITY, MISSOURI.

CASH REGISTER, INDICATOR, AND RECORDER.

No. 913,549.  Specification of Letters Patent.  Patented Feb. 23, 1909.

Application filed April 16, 1908. Serial No. 427,380.

*To all whom it may concern:*

Be it known that I, JOHN F. PARKER, a citizen of the United States, residing at Kansas City, in the county of Jackson and State of Missouri, have invented an Improvement in Cash Registers, Indicators, and Recorders, of which the following is a specification.

My invention is an improvement in cash registers of a type in which are employed multiple receptacles or money tills and a series of vertical banks of keys bearing numbers and characters corresponding to others inscribed on registering and printing wheels also slidable indicating tablets that are all movable and adapted to register and display or indicate and also print the amount of a sale, the initial of the clerk, and the character of the transaction.

My invention includes novel and improved features as hereinafter set forth, in which the following may be indicated.

One of the primary objects in a cash-register is to attract the purchaser's attention to the amount of his purchase as registered and indicated by the machine when manipulated by the salesman. In accomplishing this object, the amount as registered and indicated is exhibited from four sides of the machine so that it is practically visible from all portions of the salesroom. The attention of the purchaser and others is also attracted to the amount indicated, by employment of a flash, or intermittent, light within the register. In other words, a lamp is illuminated intermittently, the number of illuminations and length of each being controlled by mechanism which will be presently described. The characters inscribed on the sliding tablets if outlined on ground or frosted glass with colored back, would be pure white normally, but colored when the light is turned on.

Another improvement and novel feature of my machine is its capacity for indicating and registering any amount from one cent to $99.99 and so doing, I employ but three-fourths of the usual number of keys used in registers of this class, since a portion of my keys are adapted to do double service.

Another feature is the capability of registering any one of the nine different amounts from fifteen cents to ninety-five cents, all of which amounts as inscribed on the keys, end with the numeral 5, and any one of these amounts may be thrown up or indicated and registered by the setting of one key and the subsequent operation of certain mechanism, whereas in other machines of this class it is ordinarily necessary to operate two keys. No key can be operated, nor can the last indication be canceled, while the cover of any till is open. In order to operate the machine, the salesman must first press his own initial key, and in doing this he necessarily operates mechanism by which the last indication or sale is canceled, and the indicating tablets are removed from view until exposed again by the opening of a till and through the action of a shutter as hereinafter described. The remaining keys are released and the cover of the salesman's particular till unlocked at the same time. To further operate the mechanism and complete a transaction the salesman after rotating his initial key selects and rotates the proper keys which determine the amount and characters that will be indicated, registered, and printed. He then opens and closes his till cover which operates mechanism that completes the entire operation, and without the aid of a lever or crank handle usually used in this class of registers. Any one of the till covers must be completely opened or closed each time; in other words, the operator is compelled to completely open or close, since, when the till cover is partly opened or closed it cannot return until it has gone the full distance.

Another improvement and novel feature of my machine is the rotatable amount or setting keys which I use instead of the depressible keys so commonly employed in this class of register.

A further improvement consists in printing the amounts as indicated and registered on duplicate paper strips drawn off together from separate rolls. My particular improvement in this respect consists in arranging or exposing a part of the paper while passing over a flat surface so that any memorandum may be written on the top sheet, and such memorandum will be duplicated on the lower one by means of an interposed carbon ribbon, or equivalent. In the act of closing the till cover which has been opened by a particular salesman, the upper strip passes out of the register and may then be detached, while the lower one passes into a receptacle within the register and is wound around a cylinder for future reference. Autographic memoranda may also be inscribed on the paper strips and thus duplicated, so that my machine combines the functions of a cash indicator and an autographic register. The register, through the medium of the same mechanism required for indicating and registering different transactions, prints simultaneously the following five classes of data, the date, the consecutive number, an initial assigned to each clerk, the character of the transaction, and the amount received by the clerk or salesman. The register while indicating and printing also adds the different amounts received by the salesman. The till is so constructed that different receptacles or compartments are provided so that coin may be kept separate from bills etc. The opening of any one till cover locks the remaining ones, and, as stated before, it must be closed before one of the others can be opened, it being thus practicable to open but one at a time. A bell alarm is provided for each till, and the several alarms have different sounds. They are operated along with several visual flash signals above referred to.

In the drawings Figure 1 is a perspective view of my improved machine. Fig. 2 is a front elevation of certain portions of the apparatus, the casing being in section. Fig. 3 is a vertical section on the line 3—3 Fig. 2, including, however, the means for operating the visual and audible signals. Fig. 4 is a perspective view of the toothed segmental lever forming part of the key locking mechanism, the same being shown engaged with one of the nine sets of key locking bars. Fig. 5 is a sectional elevation, it being mainly in the same plane with the section shown in Fig. 3, but the key locking mechanism being shown in the released position, and the shutter inclosing the tablets or amount-indicating bars being shown drawn down, and the ratchet bars operatively connected therewith being shown disengaged from the pin carrying disks by which the tablets are raised. Fig. 6 is a central vertical transverse section of the machine, on the line 6—6 Fig. 1. Figs. 7, 8 and 9 are views of portions of the registering mechanism. Fig. 10 is a face view of one of the four sets of adding and registering mechanism. Fig. 11 is a section mainly on the line 11—11 of Fig. 12. Fig. 12 is a sectional view illustrating particularly the means for locking and releasing the till covers and other connected mechanism. Fig. 13 is an edge view of one of the several double pin carrying disks constituting a principal part of the mechanism for raising the tablets of amount-indicating bars, together with a rotatable lever arm for engaging the pins when projected. Fig. 14 is an edge view of a portion of such pin carrying double disk showing one of the pins projected by the operation of one of the rotatable setting keys. Fig. 15 is a section on the line 15—15 of Fig. 13, showing in face view, a disk provided with a segmental portion set off laterally and serving as a pin stop and pin resetting device. Fig. 16 is an enlarged horizontal section on the line 16—16 of Fig. 3. Fig. 17 is an enlarged horizontal section on the line 17—17 of Fig. 6, the ratchet bars, in practice connected with the tablets or amount-indicating bars, being shown in plan view. Fig. 18 is a perspective view illustrating the attachment of such ratchet bars to the swinging frame by which they are adjusted in and out of working position. Fig. 19 is a section on the line 19—19 of Fig. 6. Fig. 19$^a$ is a perspective view of a part of the mechanism shown in Fig. 19. Fig. 19$^b$ is a face view of the wings of the keys. Fig. 20 is a transverse section on the line 20—20 of Fig. 19. Fig. 21 is a horizontal section on the line 21—21 of Fig. 19. Fig. 22 is a perspective view of one of the rotatable pin setting keys. Fig. 23 is another view of a portion of another of the pin setting keys. Fig. 24 is a sectional view showing the printing mechanism. Fig. 25 is a section on the line 25—25 of Fig. 24. Fig. 26 is a plan view of the means for operatively connecting the indicating with the printing mechanism, the same consisting of a series of concentric shafts, each provided with lever arms by which it is connected with the respective indicating and printing mechanism. Fig. 27 is an enlarged section on the line 27—27 substantially of Fig. 19. Fig. 28 is a diagrammatic view of the electric circuit connecting the visual and audible signals with the registering mechanism. Fig. 29 is an enlarged vertical section of the machine, substantially on the line 29—29 of Fig. 1 and showing the printing mechanism. Fig. 29$^a$ is a detail view of a part of the printing mechanism. Fig. 30 is an enlarged vertical section on the line 30—30 of Fig. 29. Fig. 31 is a detail section illustrating the arrangement of one of the two inking strips or ribbons. Fig. 32 is a view illustrating a portion of the means for winding on the printed strip. Fig. 32$^a$ is a cross section on the line 32$^a$—32$^a$ of Fig. 32.

As indicated in Fig. 1, the machine has an oblong base with a rounded front and a narrower central portion which is extended to the required height. The machine as here indicated is provided with three tills, which may be indicated by A, B, C. Each till has a semi-circular cover, which, as shown in Fig. 6, is mounted upon a slidable and rotatable shaft 1 extending lengthwise of the machine casing, and is thus adapted to be swung down into the position indicated by dotted lines in Fig. 6, in which operation the shaft is rotated and in turn operates the entire indicating, registering and printing mechanism. The shaft is provided with lugs so arranged that they are adapted— see Fig. 12—to engage with, and disengage from, transverse partitions or end portions of the till covers. The shaft is also directly connected with and operates gearing and other mechanism by which the tablets or sliding bars inscribed with numbers are pushed up for indicating the amount of a particular sale, also by which registering and printing mechanism is operated, as will be further described. The central raised portion and curved front of the machine is occupied by banks of keys all of which are provided with lateral arms or wings for use in operating them. These keys are oscillatable, or rotatable a part of the revolution. The three keys on the left, marked A, B, C, correspond with and control the several till covers A, B, C, and other mechanism referred to. The keys in the second or next column bear various indications, for example, " Cash," " Charge," " Paid out," " Received on account," etc. The next vertical row of keys is for dollars, and the two on the right are for cents. The row on the right bears the digits from 1 to 9 inclusive, and the adjoining row of cent keys have on the right wing, the numerals 10, 20, 30, 40, etc. up to 90, and those on the left increase by five from 15 to 95. The dollar keys bear on the right wings, numerals 1 to 9 inclusive, thus increasing by one, and the wings on the left bear numerals from 10 to 90 inclusive, increasing by 10. By referring to Figs. 22 and 23, it will be seen that the shank 2 of each key is provided with two lugs or cams 3, 4, the same being for different uses, the inner lugs serving to push out one of the pins 5, held and carried by a rotatable double disk 6—see Figs. 13 and 14. Thus the indication and registration of the amount of a sale is governed, and the outer lug 4 serving to lock the key and hold them in normal position until released by other mechanism, as will be further described.

In Figs. 3, 5, 12, the numeral 7 indicates a segmental lever having nine radial teeth 8 and journaled on a square shaft 9 extending longitudinally of the casing. The teeth 8—see Fig. 4—enter open slots 10 in bars 11, of which there are nine pairs, one of each pair being directly over or under the other. It is apparent that so long as the teeth are engaged with these bars in the manner shown in Figs. 3 and 4, the bars cannot be slid lengthwise. As shown in Fig. 20, each pair of bars 11 engages the outer cams 4 of the keys 2, the cams projecting into notches or open slots 12, in the bars. A spiral tension spring 13 is attached to the end of the upper bar of each set, and another similar spring 14 to the opposite end of the lower bar. It is apparent that after the segmental lever 7 has released the bars 11, as shown in Fig. 5, the bars are slidable and hence permit the keys to rotate in either direction desired, the keys returning to their normal position as soon as released by the finger through the action of the spiral springs 13, 14. As shown in Fig. 3, the segment lever is locked with all the pairs of bars 11 and consequently all the money and character keys are locked. It is therefore obvious that the first operation, in order to indicate a transaction and the amount of any sale, is the release of the keys, and for this purpose, the bars 11 must be first released from the segment lever 7—as in Fig. 5. As shown in Fig. 12, the keys A, B, C, appropriated for use of three different salesmen, are provided with lever arms or elongated lugs 15 which are adapted to engage the teeth of a rack 16 forming an attachment of the segment lever—see Figs. 4 and 12. This rack is extended out from the head of the lever and provided with three lateral teeth corresponding to the three lugs 15 of keys A, B, C. The extension 17 of the segment lever 7 on which rack 16 is formed is slotted at 18 to receive the lower pairs of key locking bars 11, and has therefore no operative function. If now it be supposed that clerk A wishes to open the till, that is to say, the particular till marked by A and appropriated for his exclusive use, he will rotate the key A and thus cause the lug 15 attached to it to bear down upon the lowest of the three teeth on the segmental rack 16, and the lever 7 will, therefore, be rotated from the position shown in Fig. 3 to the position shown in Fig. 5. In other words, the distance to which the segmental lever will be rotated against the tension of the spiral spring 19 attached to its inner end is about one-half the distance between two adjacent pairs of key-locking bars 11. Thus all the said bars will be released simultaneously, so that any of the money or character keys may be operated. The clerk A therefore proceeds to effect this registration or indication. It should be stated, however, that at the first, it being a cash transaction, he has operated the cash key as well as his own lettered key. Suppose the amount of his sale is $20.53—see Fig. 1;—he will depress the left wing of the second key in the third row, and also the right hand wing of the fifth key of the fourth row, and the wing of the third key in the last row.

As shown in Fig. 12, it will be observed that in addition to lugs 15, the keys A, B, C, are provided with other shorter lugs 20, 21, 22, respectively, which are adapted to coöperate with the forked lever 23 whose lower end is engaged with the pivot shaft 1 of the till covers A, B, C. When the key A is rotated, the short lugs 20 attached thereto will be in horizontal position, and hence will not throw the forked lever 23 to the right or left. Consequently, the shaft 1 will not be shifted endwise; but if either of the other keys B and C be operated, their lugs 21, 22 will move the forked lever in one direction or the other, and consequently the shaft will be shifted. In the position shown in Fig. 12, the lug 24 of the shaft 1 is engaged with the partition 25 of the till A, and consequently when the clerk opens the till cover it will rotate the shaft and in turn set in operation the gearing that operates other mechanism to indicate and register a sale, as will be presently described. It will be further seen in Fig. 12, that the lugs 26 and 27 are not engaged with the partitions 28 and 29 of till covers B and C and consequently rotation of the shaft could not be effected by opening such till covers. Besides, those particular till covers are locked by means of a sliding bar 30—see Fig. 12—which is mounted to slide on pins 31 projecting from fixed partitions 32 arranged vertically in the casing of the machine. This bar 30 has three open slots 33 arranged or distanced from each other so that when the partition of one till cover is disengaged, those of the other two till covers will be locked with it. This may be seen from the drawing, so that further description is unnecessary. The sliding bar 30 is connected by a pendent curved arm 30$^a$ with the lower end of forked lever 23 which engages collars on the shaft 1. Thus the slide bar and shaft are shifted together endwise, and one engages as the other disengages the same till cover partition. In other words, when the bar releases a partition the shaft engages with it, and vice versa. Having now, so far as described, released all the money and character keys and also the till cover A and the latter having been opened to its fullest extent, the gearing 34, 35, 36—see Figs. 3 and 5, has been put into operation to effect other mechanism by which the sliding tablets or inscribed bars 37 for indicating the amount received, are operated, that is to say, pushed up in the manner required to allow the proper numerals to be seen through the slots 38 in the four sides of the upper portion of the machine. Before describing this operation in detail, it should be pointed out that when the segment lever 7 is moved from locking position shown in Fig. 3, several other operations have taken place. Thus, when the lever is in such locking position, the gearing, which, as before intimated, controls the register and indicating mechanism proper, is locked or prevented from operation by engagement of a spring dog 39 on the second gear 35 which engages a shoulder 40 formed on the extended shank 7$^a$ of the segmental lever. By this arrangement, not only are the indicator and register proper locked, but the till covers are also locked. When, however, the segmental lever 7 is operated by any one of the keys A, B, C, and moved to the free position indicated in Fig. 5, the lever shank or extension 7$^a$ engages a spring latch 41 and thus its shoulder 40 is carried out of engagement with the dog 39 of the intermediate gear 35 so that all the gearing is set free so far as this device is concerned.

The gear 35 just referred to has another peripheral spring dog 42, which, as shown in Figs. 3 and 5, is adapted to strike upon and depress the free end of latch 41 when the gear rotates in direction of the arrow shown on the face of the same. It will be seen that such depression will release the segment lever 7 from latch 41, so that it will be returned by springs 19 to its normal position, Fig. 3, thus locking again all the money and character keys. It is further apparent that this operation takes place when any till cover is opened, since the shaft 1 is then rotated and the gears consequently set in rotation also. The release and return of the segmental lever 7 likewise brings into locking engagement the means by which the sliding tablets or inscribed bars 37, 37$^a$ are raised to indicate money amounts, etc. These bars or tablets are arranged on the four sides of a rectangle as indicated in Fig. 6; see also Figs. 3, 5 and 16. The money bars or tablets are indicated by 37, and the initial and character bars by 37$^a$. Thus on each side of the rectangular top portion of the casing four cash-indicating bars or tablets are arranged side by side and slidable vertically so that the numbers thereon may be seen through slots 38 in the four sides of the casing extension. The bars 37$^a$ are similarly arranged and operated by the same means but they appear only on the longer sides of the rectangle. Each set of the four bars 37, that is to say bars of corresponding amounts, are connected by three rods 43 and one shorter rod 43$^a$ with slotted ratchet bars 44, and likewise the two sets of initial and character bars 37$^a$ are connected with the ratchet bars 44 by a rod 43$^a$ for the front bar and by a longer rod 43 for the rear pair, see Figs. 5, 6, 16, 17, and 18. The longer ends of such ratchet bars are provided with horizontal annular extensions, or foot portions 44$^a$, whose arrangement will be understood from the figures just referred to. The longitudinal slot of each bar receives two guide pins 45 that project from the ends of horizontal arms 46 projecting from a bar 47 arranged parallel to the back of the casing and connected therewith by pivoted links 48, so that it is adapted to swing in a vertical plane, for the purpose of carrying the said ratchet bars 44 into and out of engagement with slidable pins 5 forming attachments of the double disks 6. The latter are mounted on hubs applied to the square shaft 9, as shown in Fig. 13. It is apparent that the parts 47 and 48 constitute what may be termed a swinging frame and whose function, as already indicated, is to operate the ratchet bars as required to operate the inscribed bars 37 and 37ª. In Figs. 3 and 6 such frame is in position to hold the ratchet bars 44 in engagement with the disk pins 5, but in Fig. 5, the frame is shown retracted, or close to the back wall of the casing, and holds all the ratchet bars free from the disk pins. In Figs. 3 and 5, 49 indicates a rod connecting the lower end 7ª of the segment lever 7 with the bar 47 of the swinging frame. It is now obvious that when the ratchet bars are engaged with the pins 5 of the disks 6, as in Fig. 6, if the latter be rotated, the bars will be raised as required to bring different numerals thereon opposite the slots 38 of the upper casing extension, and thereby indicate to the purchaser, or other observer, the initial of the salesman, the amount of a sale, or character of a transaction etc. As shown in Fig. 3, when the segment lever 7 is locked with the key-locking bars 11, the rod 49 draws the swinging frame 47—48 into forward or downward position required for locking the ratchet bars 44 with the disk pins 5; but when the segment lever is in the other or unlocked position, shown in Fig. 5, the rod 49 holds the said frame and ratchet bars pushed back.

The first result of the rotation of gear 35 is to release the segment lever shank 7ª thus drawing the ratchet bars 44 into engagement with the pins 5 as shown in Fig. 6, and they are held securely by a safety appliance hereinafter described, and this engagement takes place before any of the disks 6 are rotated. It is to be understood, however, that Fig. 3 shows the position of the segment lever 7 before any of the three initial keys have been operated and also its position while any till is open. A till cover being opened, and it being connected with the shaft 1, and the latter engaged with the lowest gear 34, all the gears will be rotated simultaneously for the purpose, and with the result, that the square shaft 9 will be rotated, and this will effect the required movement of the levers or lever arms 50, see Figs. 13, 14 and 15. In the operation of the keys indicating the amounts etc., their lugs 3, 3ª, 3ᵇ and 3ᶜ, see Figs. 14, 19, 20, 21, 22 and 23, have projected certain pins from the side of the double disks 6; see especially Fig. 14, where this operation is particularly illustrated. It will now be seen that if the square shaft 9 be rotated through the medium of the gearing and opening of the till cover as already stated, all the lever arms 50 will be swung in the spaces between the several fixed disks 53 and in so doing they will come in contact with any pins 5 that may be projected from the rotatable double disks 6; and since, by the complete opening of the till covers, the several gears are rotated the full distance, the said lever arms will be carried from the position indicated on the left in Fig. 15, and dotted lines in Fig. 6, to the position indicated by dotted lines in Fig. 15.

It will be observed, see Fig. 6, that during the forward movement of the lever arms 50 through the rotation of the gears 34, 35, 36, that said lever arms swing and make about one third their maximum movement before they come in contact with any pins that may be projected, which allows the operation of other mechanism to take place, viz: the bringing into engagement, and locking of the ratchet bars 44 with the pins 5, before any of the double disks 6 begin rotation. In the course of such rotation, the ratchet bars 44, being in engagement with the pins on the rear side of the double disks, it is obvious that such bars will be raised, and through the medium of the rods 43, 43ª the tablets or bars 37, 37ª will be pushed up to different heights according to the rotation of the particular double disks with which their particular ratchet bars may be engaged. Thus, through the medium of a till cover, the shaft 1, the train of gears, and the shaft 9, provided with lever arms 50, the pin disks 6 are operated and through them the ratchet bars 44, which in turn project upward, to the required distance, the tablets 37, 37ª. The several double disks 6, are held against backward rotation by engagement of the projected pins with a notched pivoted and spring dog 51, see Fig. 15. The spring dogs 51, of which there is one attached to every disk 53, could be placed to ride over and engage the pins 5, between the outer parts of the double disks 6. I, however, place them at the side so they will engage with the projected pins which are carried to them by the lever arms 50. By this novel arrangement it is obvious that both noticeable friction and noise are avoided. Upon further rotation of the disks "through a subsequent operation," any pin projected therefrom is retracted, or pushed back, into its normal position by engagement with an inclined or cam surfaces 52; see Figs. 13 and 15. On the side of disks 6 from which the heads of pins 5 project is arranged, as shown in Figs. 13, 14, 15, what may be termed a guide 53 the same serving as regards its lower portion to prevent accidental sliding of any of the pins 5 in the double disk. The upper portion 53ª of this disk is set off laterally from the upper portion of each double or pin carrying disk, and in the space between these parts the levers or lever arms 50 are adapted to swing. The cam surfaces 52 before referred to are formed at the terminals of the segmental or set off portion 53ª of the disk 53; thus in the operation of the keys, the pins 5 of the several disks 6 can be projected only so far as permitted by the set off or guard 53ª and are guided back into their normal position in the course of the rotation of the double disks by means of the cam or inclined portions 52 of such guard.

I provide what may be termed a safety lock for holding ratchet bars 44 in firm engagement with the disk pins 5 during the operation of the double disks. The means employed for this purpose is a lever 54, see Figs. 3 and 5, which is pivoted centrally to one of the vertical partitions of the casing and its curved right hand end provided with a lengthwise slot 54ᵇ that receives a pin 55 fixed eccentrically in the side of the gear 36, while its opposite end 54ᵃ, is curved downward and adapted to engage the bar 47 of the swinging frame, by which the ratchet bars are adjusted in and out of engaging position. It will be seen that this locking device 54 is brought into action by the rotation of the gear 36 and that it begins to move with the rotation of the latter in the operation of opening a till cover and rotating the pin disks. In other words, by operation of gear 36, the slotted end of the lever 54 is raised and the outer curved end correspondingly depressed and thereby brought down into engagement with the upper side of the bar 47, whereby the latter is locked in the forward position and consequently holds the ratchet bars 44 engaged with the pins of disk 6. It is obvious that when the till cover is closed and the gears are rotated back to the position indicated in Figs. 3 and 5, the locking lever 54 is restored to the inactive position therein indicated.

In Fig. 3 I show a spiral spring 56 which is attached at its lower end to a transverse partition of the casing and at its upper end eccentrically to the intermediate gear 35, on the right of its axis. The spring is under tension, and when on the right hand side of the axis of the gear it obviously tends to hold the gearing in the normal or inactive position, and when, in the operation of the gearing, the upper end of the spring swings over to the left, it will act in the opposite direction, and in either case it steadies the operation of the gearing and materially assists in the completion of the opening and closing of the till cover.

It has been before stated that the till cover, when once opened to any degree, must be completely opened before it can be restored to the closed position. For this purpose I employ a locking device, which, as shown in Fig. 3, consists of a plate or bar 57 pivoted at 58, and its shank connected by a spiral spring 59 with the shaft 1, or any other adjacent part. A segment of the gear 34 is roughened or serrated and one of the lateral prongs of the locking device 57, is held engaged with such portion of the gear in the opening movement of the till cover and the other or right hand prong is held similarly engaged during the reverse movement. The prong 60 of the said device projects laterally from the plane of the two pawls or pawl points, and is thus adapted to be struck by wipers or cams 61—62 attached to the side of the gear 34. Thus, as will be understood by further reference to Fig. 3, the double pawl or locking device 57 is engaged with the gear 34 in such manner that the roughened portion of the latter may slide over the left hand prong while the till cover is being opened, and it will remain so engaged until the cam or wiper 62 comes in contact with the lateral prong 60 of said device and thereby shifts the latter on its pivot 58 into the opposite position in which its right hand prong will engage the gear 34; hence when the gear rotates back the cam or gear 61 will similarly engage the lateral prong 60 and again restore the device 57 to the position indicated in Fig. 3. In other words, the locking device reverses its position automatically with the movement of the gear in one direction and then the other, and locks with it in both cases so that the gear must be rotated far enough to bring the cam 61 or cam 62 into engagement with it in order to release the gearing so it can rotate in the other direction. During the rotation of the gearing thus caused by opening the till cover, it is expedient to prepare for automatically locking the segment lever in the position indicated in Fig. 3, that is to say, in engagement with all the key-locking bars 11. For this purpose I employ a bar 63—see Figs. 3 and 5, which is pivoted centrally to the adjacent partition of the casing and its lower end slotted to engage a pin or stud 64 on the face of the lower gear 34. The upper end of this locking bar 63 is located a little to the right of the lower end of the head of segment lever 7. The latter is therefore free to move to the position indicated in Fig. 5; but when the till cover is opened after the segment lever has been released and automatically restored to its position, Fig. 3, the upper end of bar 63 begins to move to the left by reason of the rotation of the gear 34 carrying its lower end in the opposite direction. Thus the bar 63 locks the segment lever practically during almost the entire period of the first operation of the gears, and while the till cover remains open.

The operation of one of the three initial keys which releases the segment lever from locking engagement with the key-locking bars 11 also effects another operation, to wit, it pulls down a box-like shutter 65—see Figs. 3, 5 and 16—which surrounds and carries or guides all the tablets or inscribed bars 37 and 37ᵃ. It is oblong and rectangular in cross section—Fig. 16—and slides freely within the rectangular top portion of the casing and is provided with slots adapted to register with the slots 38 of said casing.

Spiral springs 66 and 66ª—see Figs. 3 and 6—support the shutter 65 at normal height. The shutter is drawn down against tension of said springs when the segment lever is moved to unlocking position. To this end a slotted bar or link 68 connects the lever with the arm 67 of a rotatable horizontal shaft 67ª having two other corresponding lever arms 67ᵇ that are connected with the lower portion of the shutter at its ends. Thus parts 67, 67ª and 67ᵇ constitute practically a double elbow lever. Upon moving the segment lever to the position indicated in Fig. 5, this elbow lever pulls down the shutter as there indicated and the arm 67 locks with a spring catch 69 so that the shutter is held down even after the segment lever has been restored to the locking position, and until the said catch is released by rotation of the gear 36. For this purpose the other end of the catch is connected by a chain or wire 70 with the said gear, and the chain is not under tension so as to pull down the spring catch 69 until the gear has rotated far enough to effect the required rotation of the pin disks 6 and the setting of the tablets in the position required to indicate the transaction, and the amount of a sale, etc.

In further explanation of the operation of the shutter, I will state that the several sliding bars or tablets 37 and 37ª which as will be understood, bear numerals from zero to 9 inclusive, are normally so held that only zeros are visible through coincident slots of the shutter and the casing; but when one of the initial keys is operated, the shutter is immediately drawn down so as to conceal the movement of the slides or tablets while returning to their normal position and until the required numbers have been set in position, and then, the shutter being released automatically as before indicated, it will be retracted by the springs 66 and 66ª to normal position, and the required numerals or number characters will then appear through the slots on four different sides of the casing so that the number may be seen or read from any portion of the room in which the machine is located. The amounts received and indicated by the machine are registered by mechanism now to be described and the amounts thus registered are visible through the slot 71 in the casing—see Figs. 1, 2 and 6. There are four sets of adding wheels, as will be seen by reference to Figs. 2 and 10. Each set is composed of four notched wheels 72 that are inscribed with numerals from 9 to 0, also a larger notched wheel 73 that engages pins 5 of the double disks 6, and three notched carrying wheels 74. Each of the wheels referred to has ten notches and the carrying wheels 74, which are provided with a spring detainer 75, are arranged on a shaft 76 (see Fig. 10) so as to engage lugs 77 (see Figs. 8 and 10) on wheels 72. The latter are mounted rotatably on hubs 78 which are in turn mounted immovably on the square shaft 79 that extends parallel to the aforesaid shaft 76. In Fig. 10 the large notched wheel 73 is shown engaged with pins of one of the double disks, and as this wheel 73 rotates, it carries the smaller notched and inscribed disk 72 with it through the medium of a pawl 73ª shown in Figs. 6 and 7, and complete rotation of the disk 72 will in turn move the carrying wheel 74 one notch. It is obvious that by this operation, the units wheel when completely rotated will move the tens wheel one notch, and the tens wheel when rotated will move the hundredths wheel the same distance, and so on. Each of the four sets of adding and registering mechanisms here described operates independently of the others; and at the close of business, the amounts separately indicated by these mechanisms or sets of adding wheels, are to be added together to find the grand total of the cash receipts for the day. It may be observed in this connection that the units of the cents wheel are inscribed with the same numbers as the units of dollars wheel, and the tens of cents wheel and the tens of the dollar wheel are also alike. At the close of business it is of course requisite, after the amount registered shall have been taken off or separately recorded, that the several adding wheels shall be restored to zero, and for this purpose a suitable key is applied to the end of a squared shaft 79, which is accessible at the right hand end of the machine (see Fig. 29) where such shaft is provided with a catch that engages a pivoted, automatic locking-dog 80. In this operation of the shaft 79, see Figs. 6 and 9, a dog 81 attached to the hubs 78 of the rotatable disks engages a lug 82, see Fig. 8, formed on the side of each of the inscribed or registering disks 72, and thus carries them around to the zero position.

The money or amount keys have been generally indicated heretofore by the numeral 2 and they have been described as shown in Fig. 22, as having two lugs 3 and 4, in order that the operation of the machine might be understood in a general way. It must be now stated, that such construction and arrangement of cams is employed only on such key as is adapted to be rotated for acting on pins on both sides of it. In Figs. 21 and 22 the cam 3 is thus adapted to act in either direction on the opposite pins. Thus when the left hand wing of the first double key is pushed down it will act on the pin on the left, see Fig. 19; and contrariwise, when the right hand wing of the left key is depressed, the cam 3 will move in the opposite direction and thus act on the pin which is on the right. In this manner, one key does double service. In the case of the next double-wing key, indicating cents, its shank is shown provided with a different cam, to wit, 3ª, see Figs. 21 and 23 especially, and in this case the said cam will act on the pin on the left, see Fig. 19, whether the left hand wing or the right hand wing be depressed. The extreme right hand cents key is provided with but a single wing, which is arranged on the right, and the shank of such key is provided with a cam 3ᵇ which is arranged as shown in Fig. 21. 11ª indicates a short bar which lies under and is supplemental to the sliding bars 11 before described. Its bent outer end engages a sector-shape plate 11ᵇ, see Figs. 19 and 27, and the latter is in turn provided with a bent arm 11ᶜ, which is merely of sufficient width to engage a single pin 5 of the adjacent double disk. The said arm 11ᶜ projects up on the left of the cam 3ᵇ, see Fig. 19, and is thus always interposed between it and any coincident pin in the adjacent double disk 6. The horizontal portion of the aforesaid bar 11ª is provided with a slot 11ᵈ to receive the cam 4 of the keys in the fourth bank, see Figs. 19 and 19ª. These slots are so arranged that they extend on the right of the cams 4, and hence said cams will not move the bar 11ª when turned to the right, but the bar will be moved to the left when the cams are turned to the left. Slot 11ᵉ is simply to allow free action of the cams 4 of the bank of keys to the right. Let it now be supposed that it is desired to register 85 cents, the salesman depresses the left wing of the 8th key on the 4th bank, which causes its cam 3ª to operate on the 8th pin of the adjacent double disk on the left, see Fig. 19. Thus 80 cents are registered on or by that particular disk; but in this operation the cam 4 of the aforesaid key has drawn bar 11ª to the left, and its bent end, through engagement with the sector-shape plate 11ᵇ, carries the bracket or arm 11ᶜ against the fifth pin in the adjacent cents disk, and thus projects the pin from the disk as before described. In this manner 85 cents will be registered by the operation of the one key. It is obvious that when it is desired to register five cents it is only necessary to depress the wing of the corresponding key in the last or right hand bank, and that the lug of that key will then bear against the upturned end of the arm or bracket 11ᶜ and force laterally the fifth pin of the adjacent double disk.

In order to avoid mistakes, and for other reasons, it is desirable that every customer shall receive a receipt for every cash purchase or the memo. of any credit purchase. To this and other related ends, I have devised a printing mechanism whose operation is effected automatically whenever the ratchet bars 44 are raised by the pin-carrying double disks 6. As shown in Figs. 6 and 26, each of the six ratchet bars 44 is connected through the medium of a slotted bar or lever 82 with one of a series of concentric or nested shafts; thus one of the shafts 83 is arranged centrally, and successively inclosed by other hollow shafts 84 as shown. The other ends of these several shafts 83, 84, are provided with lateral lever arms 85, as shown in Figs. 26 and 29. All the arms are in turn connected by long link bars 86 with the lever arms 87 of printing or type sectors 88 that are mounted rotatably on a shaft 89; see Figs. 24 and 25. It is apparent that whenever any one of the several nested shafts 83, 84, is rotated, as necessarily occurs whenever a ratchet bar 44 is raised to adjust an indicating bar 37 or 37ª, as before described. The several sectors 88 with which the said shafts are connected by lever arms 85 and 87 and the connecting bar 86, will be adjusted around the shaft 89 correspondingly, or as required, for printing purposes, as will now be described.

As indicated in Fig. 24 there are two cent sectors, two dollar sectors, and also two other sectors, one for printing "cash" and other words denoting the character of a transaction, and the other for indicating the initials of the clerks or salesmen who operate the machine. On the same shaft 89 along with these several printing sectors, are mounted several printing disks 90; see Fig. 24. The one on the right is for indicating the year, the next two thinner disks for indicating the day of the month, and the middle or thickest disk for indicating months, while the three narrow disks on the left are inscribed with numbers and constitute numbering wheels. A carrying wheel 91, see Figs. 25 and 29, having a spring detainer 91ª is arranged between the units and tens, and also between the tens and hundredths of the three numbering wheels, so that when the units wheel is turned a complete revolution, the tens wheel will be advanced a notch, and similarly, when the tens wheel makes a revolution, the hundredths wheel will be advanced a notch. Thus an automatic registration may be effected of the consecutive number of each sale made or a till opened. All these sectors and disks thus described print simultaneously upon paper strips 92 and 93, as will now be described. The strip 92 is wound (see Fig. 29) upon a drum or shaft 29ª and the other strip 93 upon a corresponding drum or shaft 93ª and the two complete strips are drawn off together and passed between a printing roller or drum 94 and a small pressure roller 95. The roller or drum 94 is provided with letters suitably arranged to form the name of the proprietor of the machine or any other matter that may be preferred, and the roller is inked from the adjacent roll 96 which is provided with a suitable ink absorbing surface. From this primary printing roll 94 the two strips pass over guides 97, 98 and 99 and are then directed together horizontally beneath the sectors 88 and printing disks 90 mounted on the shaft 89, and thence pass between two guide rolls 100. The under strip 93 is wound upon a drum or spool 101 while the other is in practice torn off and delivered to a customer and constitutes a receipt or memorandum for his purchase, etc.

At the point where the two strips pass beneath the printing sectors and disks, the former are slightly separated from them, and hence independent means are required to bring them into contact with the printing media. This operation is effected by means of what may be termed a spring hammer 102, the same consisting of a curved arm journaled upon a transverse shaft 103 which is provided with a lever arm 104 to whose free end a spiral spring 105 is attached. As shown in Fig. 29 this spring will normally hold the arm 104 in alinement with it, and, in such position, the hammer proper 102 is out of contact with the paper strips. A narrow carbon or inking ribbon 106—see Figs. 29—31—is arranged to pass over and between the two paper strips 92, and 93. This endless ribbon 106 passes around an inking roller 107, and another inking roller 108 runs in contact with its outer side. Thence the ribbon runs over guide pulleys or rollers 109. It will now be apparent that if the spring hammer 102 be suitably operated, it will strike upon the lower paper strip 93 and force it upward together with the upper strip 92 and the ribbon 106, so that the upper portion of the carbon strip 106 will come into contact with the sectors 88 and disks 90, whereby both paper strips 92, 93, will be printed, one directly and the other by transfer or impression.

The broader inking ribbon 110 located alongside the narrow one 106, is arranged as shown in Figs. 29 and 30. In other words, such endless ribbon passes around the inking drum 111 and a pressure roller 112 is arranged adjacently for holding the ribbon pressed against the drum. The ribbon passes over rollers or antifriction guides 113, and between the paper strips 92, 93, and over a horizontal flat guide 114. Upon the upper strip 92 autographic memoranda of any desired character may be made by means of a pen or pencil, the guide 114 serving as a support or table during the operation. Both the rollers or drums 107 and 111 are mounted fast on their shafts, which being rotated, will obviously cause the two ribbons to travel in the direction of the arrows, as indicated respectively in Figs. 30 and 31. It now remains to indicate the means for producing this movement, also operating the spring hammer and winding on the lower paper strip 93.

The shaft 1 to which the till covers A, B, C. are attached and by which it is rotated, as has been already described, extends through the entire base of the machine beneath the printing mechanism on the ring with which it is operatively connected as will now be explained. Upon such shaft a mutilated disk 116 is mounted to rotate with it, but the shaft is still free to slide lengthwise, see Fig. 29. The same has a peripheral extension to which a spring dog 116ª is attached on the inner side, whose function will be presently described. It is obvious that this mutilated disk 116 will be turned with the shaft 1 in the direction of the arrow, whenever a till cover is opened. One end of a long push bar 117 is pivoted eccentrically to the disk 116 and its upper end (see Figs. 25 and 29) is provided with a right angular slot 118 which receives a pin 119 forming a lateral projection of the hammer arm 104. The pin is held normally in the head of the slot 118 by means of a long curved spring 117ᵇ which is attached to push-bar 117 and its free end engages notches in the periphery of the units member of the consecutive numbering wheels 90. When the disk 116 is rotated the push-bar 117 is moved longitudinally and the pin 119 still engaging the shoulder of the slot, the spring hammer 102 will be brought down so that its adjacent arm 120 (see Fig. 24) which is on the same shaft 103 with the hammer 102, will be engaged with a pivoted hook 121; see Figs. 24, 25 and 29. The spring 105 will thus obviously be put under tension, and, upon release of the hammer, the contraction of the spring will cause the hammer to fly upward instantaneously, so as to effect the desired printing. The hammer 102 is faced with rubber to suitably relieve impact in striking. When the push-bar 117 thus sets the hammer 102, the spring pawl 117ᵇ pushes on the unit number wheel and rotates it one notch. The pivoted catch 121 is connected by a rod 122 with a pivoted trip 123, which is provided with a spring 124 that holds it normally in contact with a stop-pin 125. It will now be seen that when the mutilated disk 116 is turned in the direction of the arrow (by opening of a till cover) its spring dog 116 will ride over and past the outer end of the pivoted trip 123 and into the position indicated by dotted lines Fig. 29; but when the reverse movement begins (caused by closing the till cover), such dog will act on the trip and thereby throw the spring catch out of engagement with the arm 120 of the spring hammer, and thus instantly release the latter so that it flies up and effects the printing operation. It is obvious that for this purpose the pin 119 of the hammer arm 104 must be dislodged or removed from the heel of the slot 118 in the push-bar 117. For this purpose I provide the latter with a cam 117ª which is adapted to engage and ride over a bar or other fixed point 127, whereby the slotted end of the bar 117 is raised and the pin 119 carried into longer portion of the slot. It is apparent that the several sectors 88 and the disks 90 will be adjusted according to the operation of the nested shafts 83, 84, and their connected parts. In brief, the rotative position of the printing sectors will of course correspond to the vertical adjustment of the ratchet bars 44.

The means for rotating the drum 111, on which the ribbon 110 is wound will now be described. As shown in Figs. 29 and 30, a ratchet disk 128 is fixed on the shaft 115 of the drum 111, and a pawl lever 129 is pivoted, as shown in Fig. 29, intermediately of such drum and the mutilated disk 116 on shaft 1. The lower end of this pawl lever is connected by slot and pin eccentrically with such mutilated disk. As shown in Fig. 29ᵃ, and also in 30, the upper end of the lever 129 is adapted to engage the teeth of the ratchet 128 on the left side. It will be apparent that if the lever be vibrated, that is to say moved up and down on its pivot, the ratchet disk 128 will be rotated and thereby the roller 111 also. The turning movement of the mutilated disk 116, caused as before described by opening and closing of a till cover, will effect a slight movement of the lever, or sufficient to move its upper end the distance of the length of one of the teeth of the ratchet 128. Thus each opening and closing movement of the till, through the medium of the mutilated disk 116, rotates the drum a slight distance, and the inking ribbon 110 is therefore moved or fed correspondingly, so as to bring a fresh surface between the two paper strips 92, 93. In other words both the ribbons 106, 110, are fed or moved in one direction automatically by the lever pawl each time that the till is opened and closed.

The means for winding the lower paper strip 93 on the drum 101 are as follows: The drum is provided at one end with a small ratchet disk 130 and a long spring pawl 131 (see Figs. 29, 32 and 32ᵃ) engages the same, the shank or heel of the pawl being attached to the end of the casing. Thus said pawl holds the drum against backward rotation and consequently keeps the paper strip 93 rolled up and duly stretched. There is mounted loose on the shaft of the drum a rotatable device 132 which projects laterally beyond the drum and is adapted for contact with a stop-pin 133 when rotated. A chain 134 is attached to disk 116 and to the rotatable device 132, and holds the latter retracted against the tension of a coil spring 136 which is attached at one end to the shaft and at the other to the device 132. When the mutilated gear 116 begins to rotate, the chain 134 is slackened and allows the device 132 to swing around until arrested by the stop 133; and in this operation the small spring pawl 135 rides over the ratchet 130 on the drum, without rotating the latter, which, as before stated, is held locked by the spring pawl 131; but when the mutilated disk 116 is returned to normal position as shown in Fig. 29, the chain 134 draws the rotatable device 132 back to the position indicated in full lines, and thus, through the medium of the pawl 135 which then engages the ratchet 130, the drum is rotated in the direction of the arrow and the paper strip 93 is wound thereon a certain distance and kept taut.

Recapitulating in part some of the operations just described, it may be stated that the machine prints the consecutive number, the date, the amount, and clerk's or salesman's initial and character of the transaction on a sales-slip, and this slip is handed to the customer. The machine also makes another duplicate record on the lower paper strip, which is rolled up and preserved in the machine together with any memoranda that may have been written on the upper paper strip, both operations being effected simultaneously and automatically through the operation of a till cover, as has been sufficiently described.

When the cash and printing mechanism just described are operated, both audible and visual signals are given, that is to say, a bell is sounded and a light is flashed. I will first describe the means for operating a bell. As shown in Fig. 3, see also diagram of electrical circuits, Fig. 28, there are three bells graduated in size and in practice one is connected with the till A, another with B, and the third with C. The several bells have, therefore, been correspondingly indicated in Figs. 3 and 28, by letters A, B, C. From these three bells, wires 136 run to three contact points 137, with which a switch bar 138 is adapted to make contact. Said bar is pivoted at 139 and its upper end is forked or slotted, and embraces the shaft 1 between collars fixed thereon, so that the lever is shifted on its pivot whenever the shaft 1 is slid in one direction or the other. As before described, the sliding of the shaft corresponds to the particular till which is opened. Thus when the till A is opened, the bar 138 will be in the position indicated in the diagram Fig. 28, that is to say, it will close a circuit through the middle one of the contacts 137. The circuit between the bells A, B, C and contacts 137 is completed through wire 140, the battery 148, wire 141, contact wheel 142, pivoted contact 143 and wire 144. The wheel 142 may be suitably insulated, but its periphery will be provided with a contact point 144, see Fig. 3. The said wheel is operatively connected by means of a slotted bar 145 with the middle one 35, of the train of gears which is operated by the opening of the till covers. It is obvious from the arrangement shown, that the rotation of the gear 35 will also rotate the contact wheel 142 against the tension of the spiral spring 145 which is attached to it on the left of its journal. Thus the projection 144 of said wheel will strike the pivoted contact 143 and the bell will sound until such contact is broken, which, since the till cover is opened quickly, is heard for but an instant. Wires 146 extend to an incandescent lamp 147 suspended as shown in Fig. 6 within the shutter 65. As shown in Fig. 28, these wires extend to the battery 148 and to a pivoted contact 149 that is adapted to bear upon or contact with projections 150 on the disk 142. Thus in the operation of a till cover, a bell is sounded, and the light is flashed practically simultaneously. As shown, the pivoted contact 149 can touch only the projections 150 and hence at intermediate points there is no light, the flash being therefore, necessarily intermittent, which is a much more effective signal than a steady light. The lengthwise slot in the link or bar 145 that connects the gear 35 and contact wheel 142, allows the till cover to be closed quickly without affecting the wheel 142, that is to say, without returning the wheel to normal position, which, as before indicated, is effected by spring 145. The contact wheel is toothed on one side and meshes with a pinion 151 which is operatively connected by a pivoted pawl 152 with a gear 153, and this again meshes with a pinion 154 upon whose shaft is mounted a fly or double fan 155. In the backward rotation of the contact wheel 142, after the closing of a till cover, the fly 155 is rotated and obviously retards the return of such contact wheel to its normal position. Hence the visual signals are prolonged by this pneumatic brake.

All the till covers are provided exteriorly with a horizontal handle a and interiorly with two pockets a' a' which are for receiving bills or vouchers etc. The tills are adapted, as shown in Fig. 6, to open into a compartment or recess provided in the base of the cash register, and adjacently, there are two pockets a² for silver and copper coins.

I desire it understood that in the following claims where the term "indicating devices" or equivalent, is used, it is to be taken—save when otherwise clearly indicated—as including the inscribed tablets or registering wheels, or any other medium for indicating anything for which the machine may be adapted.

What I claim is—

1. In a cash-register, the combination with a casing, a movable till cover and operating mechanism connected therewith for indicating a transaction and including keys which are oscillated on their axes and provided exteriorly of the casing with lateral wings bearing numbers, substantially as shown and described.

2. In a cash-register, the combination with indicating devices consisting of inscribed tablets or bars bearing numerals or other characters, and vertical toothed bars connected with said tablets, of rotatable disks provided with pins which are slidable transversely and adapted for engagement with said toothed bars, rotatable keys having cams or lugs adapted for engagement with the pins for projecting them, and means for engagement with the projected pins, for rotating the disks.

3. In a cash-register, the combination with indicating devices consisting of tablets or bars arranged vertically, toothed bars arranged below them, and rotatable disks provided with pins with which the toothed bars are adapted to engage for raising the tablets to give a required indication, devices and till covers connected therewith through which the pin-carrying disks are rotated when a till is opened.

4. In a cash-register, the combination with a series of disks, and pins carried thereby, indicating devices which are operatively connected with such disks and pins so that they may be adjusted for giving any required indication, means for rotating said disks, a series of rotatable amount keys, and means for locking the same.

5. In a cash-register, the combination with devices for indicating a transaction or sale, rotatable pin-carrying disks operatively connected therewith, tills having a movable member, a train of gearing and other devices which operatively connect the till member with the disks, rotatable keys provided with cams for acting on the pins carried by the disks, and means for locking and releasing said keys.

6. In a cash-register, the combination with indicating devices, rotatable pin-carrying disks which are operatively connected therewith, rotatable keys for acting on the pins of said disks and thereby projecting them therefrom, rotatable arms adapted for contact with the projected pins—for rotating the disks to the position required for setting the indicating devices, and a movable till and means for operatively connecting it with the rotatable disks.

7. In a cash-register, the combination with indicating devices, rotatable disks having slidable pins, means intervening such disks and the indicating devices for operating the latter, rotatable keys provided with cams adapted to act on the keys for projecting such as required for indicating purposes, rotatable arms mounted on the same shaft with the pin-carrying disks, gearing through which rotation is imparted to said arms, and movable till members operatively connected with such gearing.

8. In a cash-register, the combination with indicating devices, rotatable pin-carrying disks operatively connected therewith, the pins of the said disks being slidable laterally, amount keys provided with cams for acting on the pins to project them according to the required indication, slidable bars provided with notches and engaging the cams of the aforesaid keys, tension springs connected with said bars, for holding them yieldingly in normal position, a swinging segmental lever adapted to lock the aforesaid bars, gearing, and mechanism connecting the same with the pin-carrying disks for adjusting the latter to operate the indicating devices, means connected with such gearing for holding the segmental lever in the locked position, supplemental or initial clerk's or salesman's keys, and devices operatively connecting them with the aforesaid lever whereby it may be moved to the unlocking position by actuating any one of such keys.

9. In a cash-register, the combination with indicating devices, rotatable pin-carrying disks and movable till members operatively connected with such disks for rotating them, vertical toothed bars adapted to engage the pins of the disks so that the indicating devices may be raised when the disks are rotated, a swinging frame pivoted to the casing of the machine and provided with supporting and guide pins on which the said toothed bars are adapted to slide, a movable till member, and means connected therewith for operating the pin-carrying disks, and a safety locking device adapted to engage the swinging frame and thus hold the toothed bars engaged with the pin-carrying disks while the latter are being operated.

10. In a cash-register, the combination with indicating mechanism including a pin-carrying rotatable disk, a movable till member, and mechanism connecting the same with the said disks for rotating them when the tills are opened, gearing forming part of the mechanism connecting said till member with the pin-carrying disks, a pivoted lever connected at one end with the means for actuating the indicators and thereby locking the same in position when in operation.

11. In a cash-register, the combination with indicating mechanism and means for operating it, pin carrying disks forming part of such means, also toothed bars arranged vertically and adapted to engage the pins of the disks, a swinging frame on which said bars are suspended, keys for actuating and thereby projecting pins on the disks for any required indication, devices for locking the keys, a swinging lever forming part of the same, a spring catch engaging the shank of the lever when thrown to the unlocking position, and means for connecting such lever shank with the aforesaid swinging frame, whereby the toothed bars are thrown up out of engagement with the pin-carrying disks when the keys are unlocked, movable till members, and gearing operatively connected therewith, one of the gears being provided with a dog for acting on the aforesaid spring catch and thereby releasing the locking lever when a till is opened, and means for retracting said lever to the locking position when thus released.

12. In a cash-register, the combination of a movable till member, gearing connected therewith, rotatable keys and means for locking the same which includes a swinging lever, a pivoted bar 63 one end of which is attached to one of the gears and the other adapted to swing under the head of the lever for holding it in locking engagement while the till is being opened and closed.

13. In a cash-register, the combination with indicating mechanism, movable till cover and means for setting or adjusting the latter to give any required indication, the same including rotatable pin-carrying disks, keys for acting on the pins carried by the disks, means for locking the keys immovably when the till cover is open, the same including slidable bars and a toothed swinging lever adapted to engage said bars.

14. In a cash-register, the combination with indicating mechanism and means for operating the same which includes pin-carrying disks and toothed bars adapted to engage the pins thereon, rotatable devices for engaging pins projected from the disks, gearing operatively connected with such devices and a till cover for actuating the gearing when opened and closed, and a spring 56 attached eccentrically to one of the gears for assisting in opening and closing the tills.

15. In a cash register, the combination with a series of vertically slidable bars or tablets suitably inscribed to give a required indication, a box-like shutter which surrounds the same, an elbow lever connected with the lower end of the shutter, a spring supporting the shutter at normal height, amount keys, means for locking the keys and operating the said lever, and initial keys adapted to operate and release such locking means.

16. In a cash register, the combination with indicating means comprising vertically adjustable bars or tablets, a slidable shutter applied to the same, an elbow lever connected with the lower end of the shutter, a spring catch for locking said lever to hold the shutter retracted while the indicators are being set, a movable till member, and means for operatively connecting the same with the aforesaid catch whereby when the till is open the catch releases the shutter.

17. In a cash register, the combination with a casing provided with openings or slots on its several sides, of a series of vertical sliding tablets or bars inscribed for different indications, and arranged opposite the several sides of the register, means for adjusting these tablets higher or lower, the same including toothed bars having lateral foot portions and rods connecting the latter with the tablets, and means coacting with the toothed bars for raising them and thereby adjusting the tablets as required.

18. In a cash register, the combination with a series of vertically sliding tablets or bars and a casing having openings in its sides of a vertically slidable shutter provided with corresponding openings, a spring normally supporting the shutter, means for pulling down and locking the shutter temporarily, and means for releasing the shutter automatically when a till is opened.

19. In a cash register, the combination with indicating and registering mechanism and means for operating the same which includes rotatable disks and slidable pins carried thereby, rotatable keys provided interiorly with cams for actuating the pins and projecting them according to any required indication, rotatable arms adapted to engage the projected pins and thereby rotate the disks, a guard consisting of a disk fixed in place alongside the pin-carrying disk and having its upper portion set off laterally, and provided with inclines or cams for restoring the projecting pins to their normal position.

20. In a cash register, the combination with indicating and registering mechanism of rotatable double disks, pins held slidably in the peripheral portions thereof, rotatable keys provided with cams adapted to act on said pins for projecting them from the disks according to any required indication, a guard or stop arranged alongside the double disks for arresting the pins when projected, a rotatable shaft on which the disks are mounted, lever arms fixed with the shaft and projecting between the guard and double disks, for engagement with projected pins, a movable till member and gearing connecting it with the said shaft, for rotating the shaft when a till is opened.

21. In a cash register, the combination with indicating and registering mechanism of a series of rotatable pin-carrying disks, the pins thereof being slidable, rotatable keys provided interiorly with two sets of cams and exteriorly with lateral wings for rotating them, one set of the interior cams serving to actuate the pins for projecting them according to any required indication, and locking devices normally engaging the other cams, and means for releasing such devices.

22. In a cash register, the combination with indicating means and rotatable pin-carrying disks operatively connected therewith, the pins thus carried being slidable laterally, certain of the adjacent disks having pins projecting inwardly towards each other and adapted to be slid in opposite directions, a rotatable key having a single cam located between such disks and thus adapted, when rotated in either direction, to act upon either of the opposite pins and to project the same.

23. In a cash register, the combination with indicating means, rotatable disks and slidable pins carried thereby, a rotatable key provided interiorly with a cam $3^a$ adapted to engage the said pins for projecting them according to any required indication, and with an outer cam 4 arranged adjacently, locking mechanism including slidable bars having notches for receiving the outer cam, and a supplemental bar $11^a$ arranged parallel to such locking bars, and also engaging the outer cam, a spring plate with which such supplemental bar is connected, the plate having an arm $11^c$ which is adapted for contact with the pins of the adjacent disk whereby a single actuation of the said key suffices to effect the registration of both tens and units.

24. In a cash register, the combination with indicating and registering mechanism and means for operating the same, of a series of rotatable actuating keys provided with cams, devices for engaging the cams and thus locking the keys, such devices including a swinging segmental locking lever provided with a rack, and a series of keys provided with lateral lugs adapted to engage said rack, whereby upon rotating any of said keys the lever will be rotated to unlocking position.

25. In a cash register, the combination with indicating or registering mechanism and means for adjusting the same, of rotatable keys forming part of such mechanism, a series of tills having movable parts and transverse partitions or end portions, a horizontal slidable shaft provided with lugs for engaging such partitions, the lugs being so arranged that when one till is open the others are locked, devices for locking the aforesaid keys, the same including a segmental lever, keys adapted to engage the said lever for rotating it, and a device which operatively connects said keys with the aforesaid shaft whereby the segmental lever is moved to the unlocking position by operation of any one of the keys and the shaft is shifted corresponding to that key to unlock a set.

26. The combination with indicating mechanism, rotatable keys and devices operatively connecting the same with the indicators, of slidable bars for locking the keys, a toothed swinging lever for engaging such bars, keys provided with lugs 15 adapted to engage the lever for moving it to the releasing position, movable till members and a shaft which is shiftable endwise and provided with lugs that engage such till members, the arrangement being as described so that when one till is opened the others are locked with the shaft, a pivoted lever that engages said shaft, the aforesaid salesman's keys being further provided with lugs adapted to engage said lever for shifting it according to the position to which any one of the keys may be turned and thereby shifting the lever correspondingly.

27. In a cash register, the combination with indicating and registering mechanism and means for setting the same, of a slidable shaft provided with lugs, tills having partitions provided with slots adapted to receive said lugs, a pivoted lever for sliding the shaft, initial keys for moving said lever, a slidable bar 30 which is connected with the said lever and provided with notches to receive the edges of the till partitions, the arrangement being as described, whereby when the aforesaid segmental lever is moved to the unlocking position by one of the initial keys the sliding bar and the shaft are simultaneously adjusted to lock with all the till members save one.

28. In a cash-register, the combination with indicating mechanism, toothed bars connected therewith, rotatable disks provided with slidable pins for engaging such bars, a rotatable device arranged alongside the disks for engagement with pins that may be projected therefrom, a rotatable key provided at its inner end with a straight-faced lug 3ª arranged for contact with any of the series of pins in the rotatable disks and thus adapted for projecting a pin when the key is rotated in either direction.

29. The combination with rotatable printing devices, of a spring-retracted hammer adapted to press the strip against the printing devices, and having a lateral pin, a rotatable member 116, and a push-bar pivoted thereto and having its free end provided with a right-angular slot to receive the hammer pin, a spring pawl secured to the push-bar at one end and its free end acting on one of the printing devices and serving also to hold the heel of the push-bar temporarily engaged with the hammer pin, said push-bar having a cam projection, and a fixed abutment on which such cam is adapted to ride for effecting release of the hammer from the heel of the slot so that the hammer may make its stroke instantaneously.

30. The combination with printing devices, of a spring-actuated hammer, a push-bar connected therewith, and a rotatable member for actuating the push-bar to set the hammer, a pivoted latch for engaging the hammer and holding it temporarily in the retracted position, and trip mechanism connected with the latch and such rotatable member and adapted to be operated by the latter for releasing the hammer.

31. The combination of devices for printing upon superposed paper strips, means for winding such strips, means for holding and moving inking-ribbons arranged in connection with the strips in the manner described, whereby matter may be printed upon the strips and autographic matter may be inscribed thereon, mechanism for moving the indicating ribbons step-by-step, and a preliminary printing or impression drum, 94, arranged to work in contact with the outer strip.

32. The combination with devices for printing upon paper strips lying one above another, guides for said strips as they pass from the inking ribbons, a winding-on drum to which the end strip is attached, a ratchet fixed on the drum, a pawl engaging the ratchet and preventing backward rotation of the drum, a swinging device 132 mounted on the shaft of the drum and adapted to engage a fixed stop, a spring pawl attached to such rotative device and adapted to slide over the aforesaid ratchet, a rotatable member 116, a shaft on which it is mounted whereby it is actuated correspondingly with the till of a cash register, and a chain connecting such rotatable member with the aforesaid device 132, whereby the under strip is wound on the drum step-by-step corresponding with the intermittent movement of the said rotatable member.

33. The combination with operating mechanism, including indicating devices, and a salesman's initial keys with intervening setting mechanism, a movable till member, a rotatable shaft with which such member is connected, a train of gears operatively connected with the shaft, a series of audible signals corresponding to the initial keys, a series of electrical contacts similarly corresponding with the keys, a switch connected with the aforesaid shaft and operated on the contact points, and an electrical circuit including the signals and such contact points, also a rotatable disk provided with peripheral projections, a pivoted member adapted for contact with such projections, and means for connecting such disk with the train of gears whereby it is rotated and thus caused to make and break the circuit, and a pneumatic brake or retarding device operatively connected with the disk, and means for retracting the latter to normal position when the till member is closed.

34. The combination with a casing, indicating devices and setting mechanism including initial keys, a movable till member, and a train of gears operated thereby, an electric lamp arranged in the upper portion of the casing and behind the transparent indicating device and an electric circuit including the lamp contact points, and a shiftable switch movable on said points and operatively connected with the movable till member, a rotatable disk provided with peripheral contacts, a pivoted device 149 adapted for contact with such projections. means for connecting the disk with the train of gears whereby it is rotated in one direction when the till cover is opened, means for moving it in the opposite direction and a pneumatic retarder operatively connected with the disk whereby upon opening the till one or more flash signals are given, and upon closing the same the time during which signals are given is prolonged.

35. In a cash-register, the combination with a rectangular extension having inspection openings in its four sides and all arranged in the same horizontal plane, a series of translucent tablets or inscribed bars arranged vertically and slidably parallel to the sides of said extension and opposite said openings, and means for projecting such bars upward to bring numerals thereon opposite the openings, and an illuminating device arranged behind the several tablets, and a till member operatively connected with the means for adjusting the tablets, substantially as described.

36. In a cash-register, the combination with a till member, an indicator and an electric lamp arranged with the latter, of mechanism which is operatively connected with the said till member and includes an electric circuit and electrical make-and-break devices, and means for retarding the operation of said devices whereby intermittent flash signals are given after closing of the till, substantially as described.

JOHN F. PARKER.

Witnesses:
 SOLON C. KEMON,
 AMOS W. HART.